United States Patent [19]

Robb

[11] Patent Number: 4,926,445

[45] Date of Patent: May 15, 1990

[54] EXTERNAL ASYNCHRONOUS INPUT TESTER FOR BIT SLICE MACHINES

[75] Inventor: James R. Robb, Marion, Iowa

[73] Assignee: The United States of America as represented by the Secretary of the Air Force, Washington, D.C.

[21] Appl. No.: 68,864

[22] Filed: Jul. 1, 1987

[51] Int. Cl.⁵ .............................................. H04L 7/00
[52] U.S. Cl. .................................... 375/106; 375/110; 328/63
[58] Field of Search ................. 370/58, 110.1, 85, 13, 370/44, 100, 103; 340/825.5, 825.2; 375/106, 107, 110; 307/269; 328/63, 72, 139; 377/47

[56] References Cited

U.S. PATENT DOCUMENTS

| | | | |
|---|---|---|---|
| 3,343,141 | 9/1967 | Hackl | 340/172.5 |
| 4,241,416 | 12/1980 | Tarczy-Hornoch | 364/900 |
| 4,253,183 | 2/1981 | Taylor et al. | 371/16 |
| 4,381,540 | 4/1983 | Lewis et al. | 364/200 |
| 4,418,383 | 11/1983 | Doyle et al. | 364/200 |
| 4,454,589 | 6/1984 | Miller | 364/716 |
| 4,528,641 | 7/1985 | Burrows | 364/757 |
| 4,677,433 | 6/1987 | Catlin et al. | 340/825.2 |
| 4,754,456 | 6/1988 | Yato et al. | 370/13 |

Primary Examiner—Benedict V. Safourek
Assistant Examiner—Ralph Smith
Attorney, Agent, or Firm—William G. Auton; Donald J. Singer

[57] ABSTRACT

A timing circuit is disclosed for use with microprocessors which perform bit slicing within their arithmetic logic units. This timing circuit combines the synchronization of digital data inputs with the generation of the clocking signal, by dividing an oscillator frequency signal into the clocking signal, using a number of cycles of the oscillator frequency signal to synchronize the digital data inputs with the clocking signal, and outputting a synchronized clocking signal as soon as the digital data input signals are synchronized with the clocking signals. In a situation where the clock is derived by dividing the oscillator frequency by four, two of the four oscillator cycles are used to resynchronize the test input. The waste of overhead wait states and individual input resynchronization circuits are eliminated.

6 Claims, 3 Drawing Sheets

4,926,445

EXTERNAL ASYNCHRONOUS INPUT TESTER FOR BIT SLICE MACHINES

STATEMENT OF GOVERNMENT INTEREST

The invention described herein may be manufactured and used by or for the Government for governmental purposes without the payment of any royalty thereon

BACKGROUND OF THE INVENTION

The present invention relates generally to the testing and clocking of microprocessors that perform bit slicing, and more specifically to a computer circuit and logic function which combines resynchronization stages with part of the clock circuit in order to expedite resynchronization.

Many bit-slice applications require that the clock enters a wait mode (Wait states added) until an asynchronous input occurs (such as transfer acknowledge, FIFO input ready, FIFO output ready, etc). In a single micro-cycle operation, the clock and test circuit must accomplish the following the clock circuit must decode what kind of operation is to be performed and select the proper test input;
the clock should allow some time for the test input to become stable before testing;
the test input should be cleared (wait states to be added) at the beginning of the cycle to prevent previous test conditions from releasing the clock; and
when the asynchronous input becomes valid, two stages of synchronization should be used before the next micro-cycle clock is generated.

Some additional clocking operations might include:
the clock circuit must free run during reset;
some applications might require synchronous wait operations as well as asynchronous; and
some applications might require programmable cycle lengths.

The task of resynchronizing microprocessors after they receive asynchronous inputs (such as FIFO inputs, transfer, acknowledge, etc.) is alleviated, to some extent, by the systems disclosed in the following U.S. Patents, the disclosures of which are incorporated herein by reference:

U.S. Pat. No. 3,343,141, issued to Hackl;
U.S. Pat. No. 4,241,416, issued to Tarczy-Hornoch;
U.S. Pat. No. 4,253,183, issued to Taylor et al;
U.S. Pat. No. 4,381,540, issued to Lewis et al;
U.S. Pat. No. 4,418,383, issued to Doyle et al;
U.S. Pat. No. 4,454,589, issued to Miller; and
U.S. Pat. No. 4,528,641, issued to Burrows.

The Miller reference discloses a programmable arithmetic logic unit for performing high speed bit sliced computations. A bit slicer is also shown in the Burrows patent.

Doyle et al is included for its references to bit slicing and the patent's discussion of the bit slicing process. Lewis et al disclose an asynchronous device for formulating channel error status information in a data processor.

Tarczy-Hornoch is directed to a microprocrocessor monitor or analyzer useable with all microprocessor families having accessible or reconstructible address and data busses up to 16 bits wide each.

Hackl discloses a system for by-passing the main source of internal gating and sequence selecting control signals of a data processor to permit diagnostic testing. In Taylor et al faults in a data processor are diagnosed in conjunction with the storage of signals at test points in the execute stage of the processor during the execution of a command-under-test.

The conventional resynchronizing approach used in prior art systems is to inhibit the clock partway through its cycle. This inhibit continues until the re-synchronized test input becomes valid. The clock then proceeds to complete its cycle.

The problem with the conventional approach is that after the asynchronous input has arrived, the clock circuit must still wait for the re-synchronization process to occur before it can continue. This means one or two overhead wait states are added after the input becomes valid. This problem of overhead wait states is particularly agonizing when the input becomes valid before the clock ever reaches its inhibit phase. In this case, the clock should be able to proceed without adding any wait states. Unfortunately, the clock will still have to add one (or two) overhead wait states just to allow the input test circuitry enough time to clear the input test and complete the two stages of synchronization.

In view of the foregoing discussion, it is apparent that there currently exists the need for a resynchronizing system that minimizes the overhead wait stages after an asynchronous input has been supplied to a microprocessor. The present invention is intended to satisfy that need.

SUMMARY OF THE INVENTION

The present invention includes a computer circuit and logic function for testing microprocessors that perform a bit slicing operation in their arithmetic logic unit. The present invention combines resynchronization stages with a part of the clock. In one embodiment, where the clock is derived by dividing the oscillator frequency by four, two of the four oscillator cycles are used to resynchronize the test input. The waste of overhead wait states is eliminated because the test inputs actually are used by the logic circuits to derive the system clock signal from the oscillator frequency.

It is an object of the present invention to provide a microprocessor timing system which combines the clock circuit and the resynchronization process together.

It is another object of the present invention to minimize the overhead wait stages after an asychronous input has been supplied to a microprocessor.

These objects, together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention is a microprocessor timing system which combines the clock circuit and the resynchronization stages together. As mentioned above, many bit slice microprocessors require that the clock enter a wait mode (wait states added) when an asynchronous input occurs. Conventional test methods inhibit the system clock until the resynchronized test input is recognized as valid, after which the system clock completes its cycle.

Figure 1:
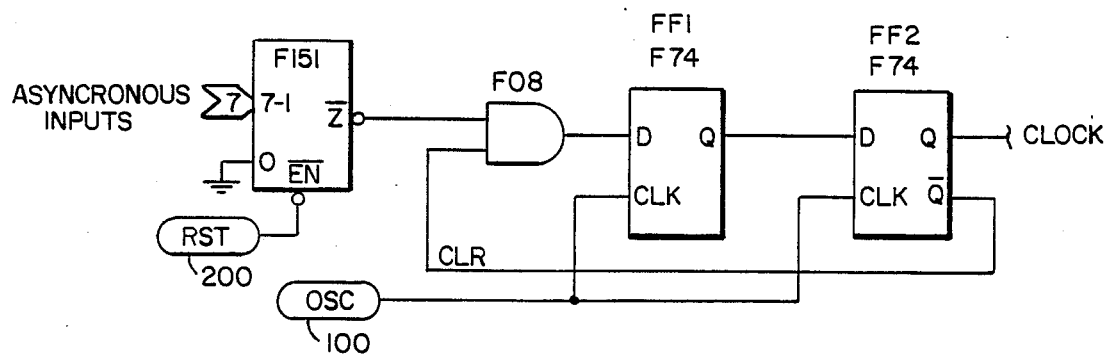
FIGS. 1 and 2 are schematics of two embodiments of the present invention.

The reader's attention is now directed towards FIG. 1, which is one embodiment of the present invention. The computer circuit of FIG. 1 is a divide-by-four clock circuit, in which the system clock signal is produced by dividing the oscillator frequency by four. However, the system of FIG. 1 also combines the clock circuit with the resynchronization stages using: an oscillator 100, an AND gate F08, and two flip-flops FF1 and FF2.

Each flip-flop is a conventional bistable multivibrator, Eccles-Jordan circuit having two stable states. In one state, the first stage is conducting and the second is cut off. In the other state, the second stage is conducting and the first stage is cut off. A trigger signal changes the circuit according to the state of the data input (D). For counting and scaling purposes, a flip-flop can be used to deliver one output pulse for each two input pulses.

In FIG. 1, a digital multiplexer unit F151 produces a typical asynchronous signal (such as transfer acknowledge, FIFO input ready, FIFO output ready, etc.)

Assume initially that the output of the F151 is "high". (This is the case during reset as per the first clocking consideration). The flip-flops FF1 AND FF2 and the AND gate F08 form a free-running divide-by-four clock circuit, which operates as follows. Under normal operations, when the clock goes "high" (start of oscillator cycle "o"), the CLR line forces the D input of FF1 "low". This "low" is then clocked through the next two oscillator cycles, causing the clock output to go "low" and completing the first half of the clock cycle. In addition, the clear line being "low" overrides the output of the F151. This allows the new micro cycle, as initiated by the rising edge of the clock signal (CLOCK), enough time to stabilize and select the next test input.

During the second half of the clock cycle, the now cleared FF1 and FF2 are used for re-synchronization. At the start of oscillator cycle 3, FF1 will sample the output of the test unit F151. If the output is "low", then the already "low" output of FF1 will not change and the clock cycle will stretch. When the F151 output becomes "high", FF1 and FF2 will clock the "high" through, resynchronizing it in the process, and complete the last half of the clock cycle. Notice that only two oscillator clock cycles are added when the F151 output becomes "high". As long as the F151 output becomes "high" before the start of oscillator cycle 3, no wait states are added. For a free-running clock (no wait states), the micro-code simple selects a constant level test mux input. (A "low" into the F151 test unit gives a "high" out.)

The reset (RST) unit 200 of FIGS. 1, 2, 6 and 8 is a conventional pulse generator which outputs a digital pulse, as an input to the digital multiplexer unit FF151, to ensure that the clock is running. The reset unit is used during power up to initialize the system.

Figure 2:
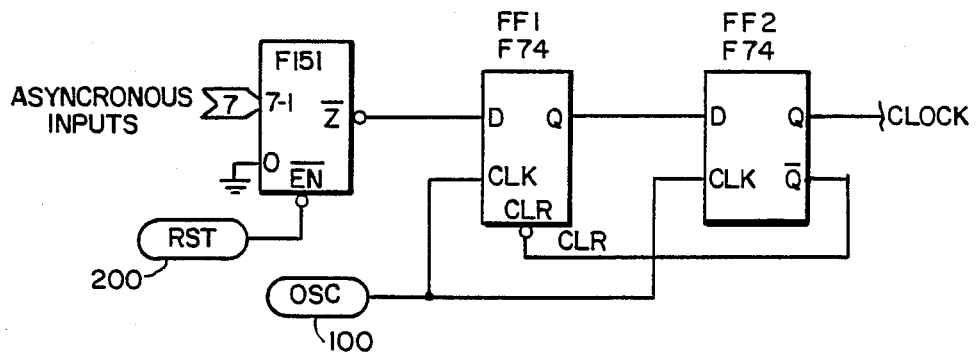

The system of FIG. 1 is a free-running divide-by-four clock circuit which combines resynchronization stages with part of the clock circuit. FIG. 2 is another embodiment of the present invention, which results in a divide-by-three clock circuit using: an oscillator 100, and two flip-flops FF1 and FF2. The system of FIG. 2 receives an asynchronous input from the digital multiplexer F151 and, in a manner similar to the system of FIG. 1, combines resynchronization with the divide-by-three clock signal.

Figure 3:
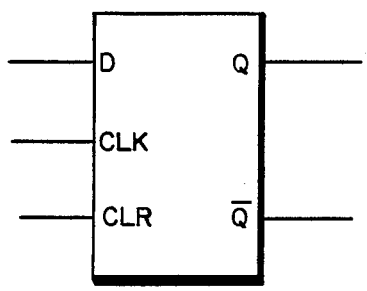
FIG. 3 is a schematic of a prior art Eccles-Jordan flip-flop circuit element.

Before progressing further, it is important to note that all flip-flop circuits are identical conventional Eccles-Jordan circuits which, as depicted in FIG. 3, have: three input terminals D, clock (CLK), and clear (CLR); as well as two output terminals Q and $\overline{Q}$. In all the figures, these terminals are only depicted if they are actually used.

When the flip-flop of FIG. 3 is in the ONE state, the 1-side output (Q) is high, and the O-side output ($\overline{Q}$) is low. When the flip-flop of FIG. 3 is in the ZERO state, the 1-side output (Q) is low, and the O-side output ($\overline{Q}$) is high.

Applying a signal to the data input (D) will cause the output of Q to follow as soon as the rising edge of a clock signal input occurs. Applying a signal to the clear input (CLR) will cause the flip-flop to go into the ZERO state.

The clock (CLK) input is an internal trigger which will cause the flip-flop to change its state according to the data input (D).

Finally, throughout the figures, the state indicator symbol is used where appropriate. This symbol is a circle which is used in conjunction with a logic symbol as follows.

The state indicator, if used on an input, states that to satisfy that particular input, the signal must be a low logic level. A state indicator at the output of a symbol indicates that when the input is satisfied, the output will be a low logic level. In other words, a state indicator on an input indicates that to satisfy that input, the ACTIVATING signal must be low. If the output has a state indicator, then when the gate is satisfied, the ACTIVATED signal will be low. The state indicator at the output of the digital multiplexer F151 of FIGS. 1, 2, 6 and 8 indicates that the multiplexer receives and inverts digital data signals to produce its output signals. Returning to FIG. 2, the state indicator on the CLR input terminal of flip-flop FF1 indicates that this is an inverting input terminal.

The notation used throughout the Figures represents the invention in terms of standard logic symbols used in computer circuits. When understood in terms of the operation of a flip-flop, all Figures speak for themselves and need be described only in terms of identifying the logic elements used, and the results they produce. For example, FIG. 2 is a divide-by-three clock circuit which automatically combines the test input signal from F151 with the clock signal output by FF2 to minimize the resynchronization time. The system of FIG. 2, as mentioned above, uses: an oscillator 100, and two flip-flops FF1 and FF2.

The oscillator in FIG. 2 outputs an oscillator frequency signal which enters the CLK input terminals of FF1 and FF2. The asynchronous test signal from the digital multiplexer F151 enters the data input (D) of FF1.

The 1-side output of FF1 enters the data input (D) of FF2 so that FF2 outputs the divide-by-three clock signal out its 1-side output, and an anti-divide-by-three clock signal out its 0 side output to trigger the clear input (CLR) of FF1.

Figure 4:
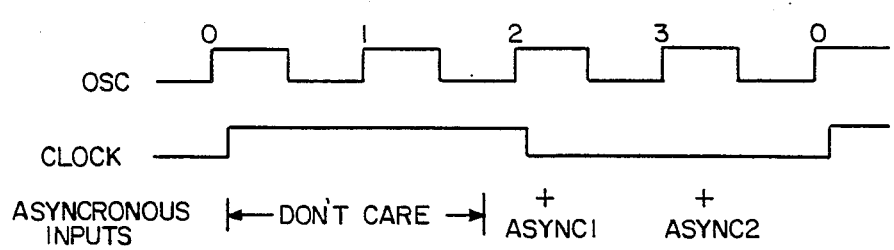
FIGS. 4 and 5 are charts which respectively depict the oscillator and clock signals for the systems of FIGS. 1 and 2.
Figure 5:
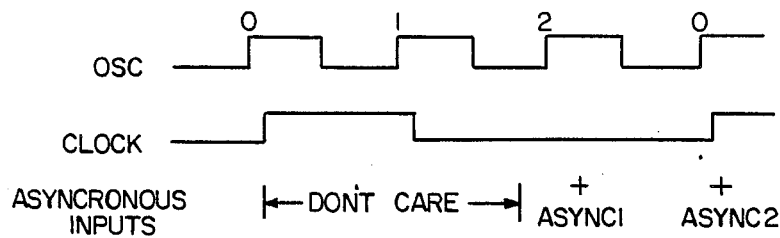

FIGS. 4 and 5 are charts which respectively depict the oscillator signal and clock signal for asynchronous and synchronous inputs into the systems of FIGS. 1 and 2.

Figure 6:
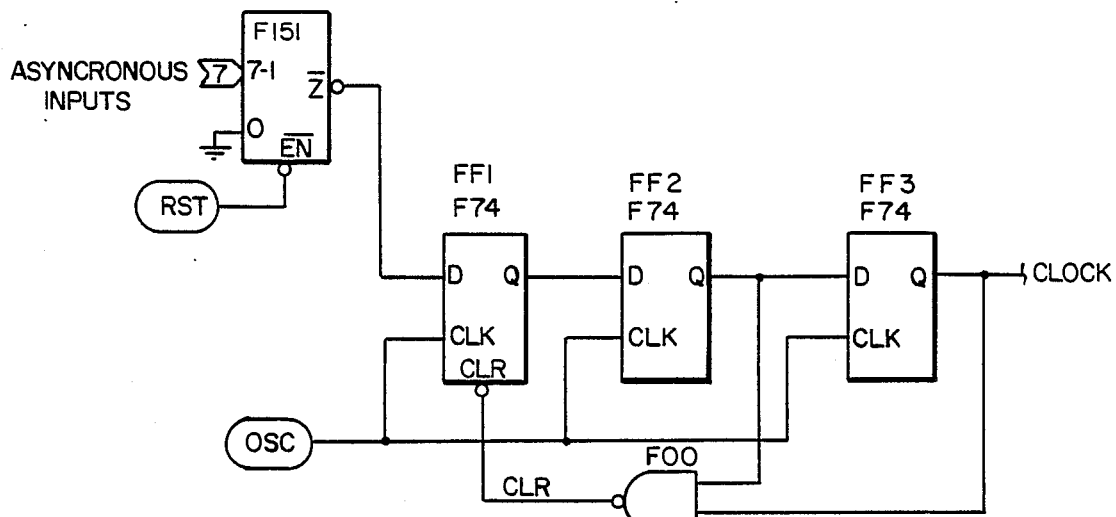
FIG. 6 is a schematic of another embodiment of the present invention.

FIG. 6 is a divide-by-four system which is similar to the system of FIG. 1, but which uses three stages of synchronization with: three flip-flops FF1, FF2 and FF3, an oscillator 100, and a NAND gate FOO.

Figure 7:
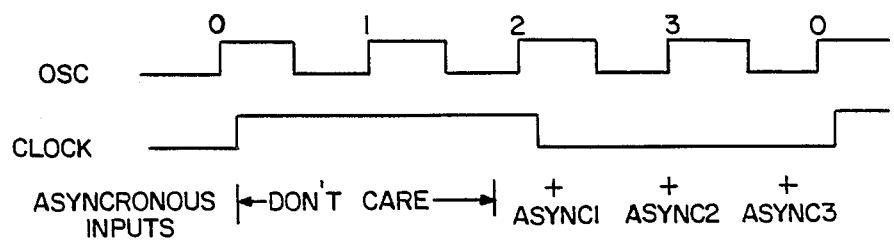
FIG. 7 is a chart depicting the oscillator and clock signals associated with the system of FIG. 6.

FIG. 7 is a chart which depicts the oscillator signal, asynchronous input signal, and resulting clock signal of the system of FIG. 6.

Figure 8:
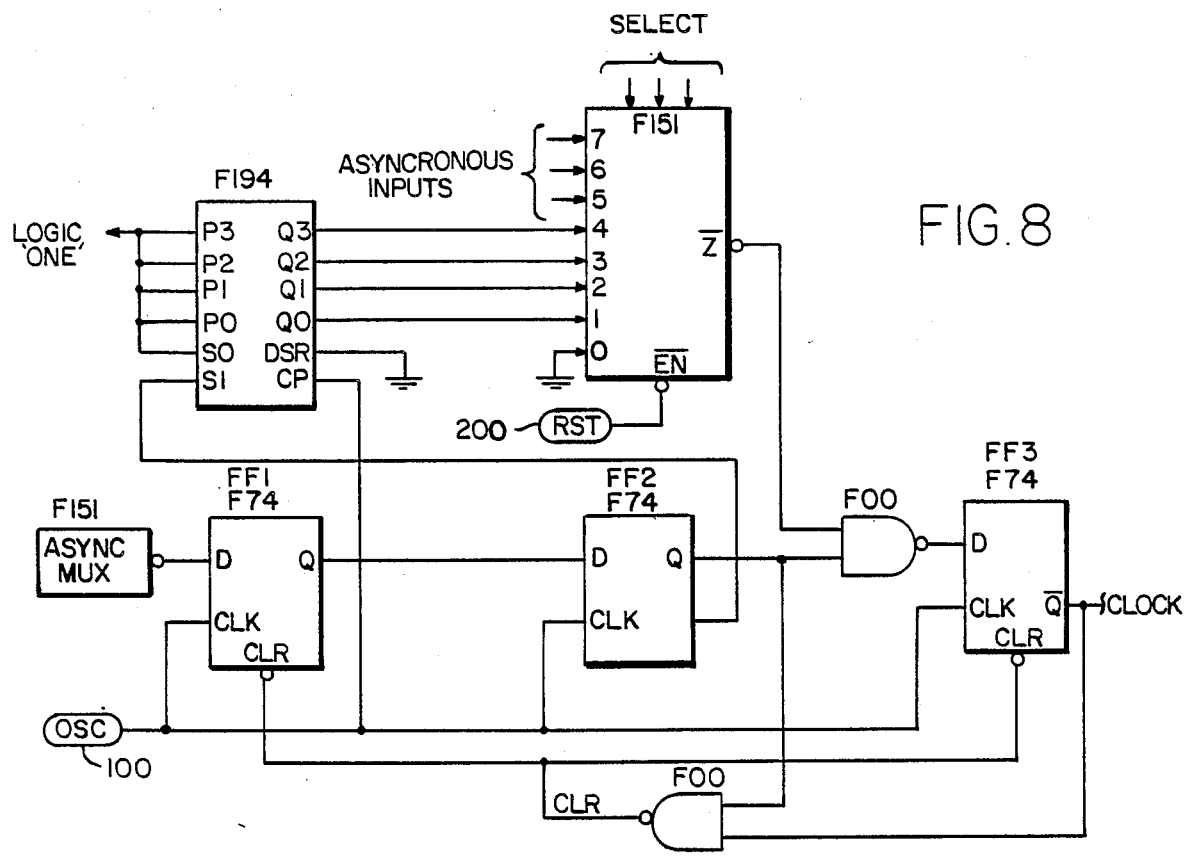
FIG. 8 is a schematic of another embodiment of the present invention.

The system of FIG. 8 is a computer clocking circuit which combines resynchronization with a clocking system that can produce a divide-by-4, 5, 6, 7 or 8 clocking signal for a microprocessor. The system of FIG. 8 incorporates programmable wait states by coupling a shift register F194 into the input of the synchronous test multiplexer F151 of FIG. 1. The system of FIG. 8 uses: three flip-flops FF1, FF2, and FF3, two NAND gates (each labeled FOO), an oscillator 100, two asynchronous digital multiplexers (each labeled F151) and a shift register F194.

The shift register receives, stores and outputs a logic 1 to the first asynchronous digital multiplexer F151. The first asynchronous digital multiplexer F151 has eight digital data input terminals (0–7), three control terminals, and one output terminal. The control terminals indicate how the clock signal is to be determined from the oscillator frequency signal.

Figure 9:
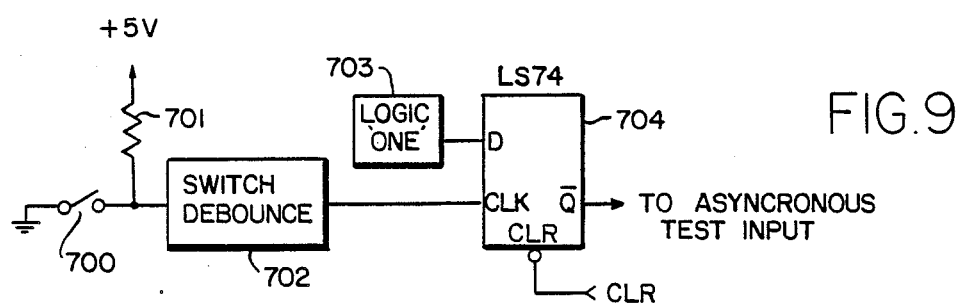
FIGS. 9 and 10 are schematics of circuits that may be optionally used to provide asynchronous inputs to the asynchronous miltiplexer F151 depicted in FIG. 8.
Figure 10:
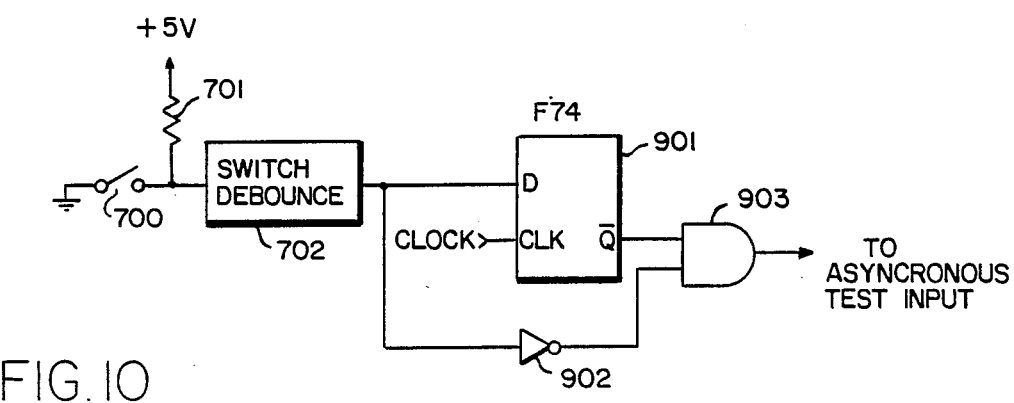

FIGS. 9 and 10 are illustrations of two embodiments of circuits that may be used to provide inputs into the asynchronous multiplexer F151 of FIG. 8. In the embodiment of FIG. 9, the circuit is a single-step test circuit composed of a switch 700, an input resistor 701, a switch debounce 702, a logic 1 signal source 703, and a flip-flop 704. When the microprocessor selects the "single-step" digital multiplexer input, an input into the inverter input CLR terminal of the flip-flop 704 generates an input into the digital multiplexer F151, which causes it to halt the clock. When the switch 700 is pressed and released, the clocked flip-flop will allow the clock circuit to continue.

FIG. 10 is a schematic of a halt test circuit, which uses a switch 700, an input resistor 701, a switch debounce 702, a flip-flop 901, an inverter buffer 902, and an AND gate 903. When the micro-cycle tests the "halt" test input, the clock will only stop if the switch is closed. When the switch is re-opened, the clock will continue. The switch debounce unit 702 is a conventional element which eliminates bounce signals which are characteristic of mechanical switches. The invention, as described above, combines the clock circuit and the resynchronization of test inputs together to eliminate the waste of overhead wait states. Additionally, clocking considerations such as reset free-run, programmable wait states, synchronous wait states, and test features can easily be incorporated into this method.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A timing circuit which produces a clicking signal for a microprocessor which is resynchronized with digital data input signals, said clocking signal having a value and said timing circuit comprising:

an oscillator which produces an oscillator frequency signal which has a value;

a digital multiplexer which receives and inverts said digital data input signals to produce output signals;

an AND gate which has a first and second input terminal and an output terminal, said AND gate receiving said output signals from said digital multiplexer on its first input terminal, said AND gate receiving an anti-clocking signal over its second input terminal, said anti-clocking signal being an inverse signal with respect to said clocking signal, said AND gate producing an output signal over its output terminal by performing an AND function using said output signals from said digital multiplexer and said anti-clocking signal;

a first flip flop which has a data input terminal, a clock input terminal, and a 1 side output terminal, said first flip flop receiving the output signal from said AND gate over its data input terminal, said first flip flop receiving said oscillator frequency signal from said oscillator over its clock input terminal, said first flip flop producing an output signal over its 1 side output terminal; and a second flip flop which outputs said clocking signal and said anti-clocking signal such that the value of said clocking signal is produced by dividing the value of said oscillator frequency signal by four and synchronizes said microprocessor with said digital data input signals, said second flip flop receiving the output signal of said first flip flop over a data input terminal of said second flip flop, said second flip flop having a clock input terminal which receives said oscillator frequency signal from said oscillator, said second flip flop having a 1 side output terminal over which it outputs said clocking signal, said second flip flop having an 0 side output terminal over which it outputs said anti-clocking signal.

2. A timing circuit, as defined in claim 1, wherein said dividing means includes a divide-by-three timing circuit which comprises:

a first flip-flop which has a data input terminal, a clear input terminal, a clock input terminal, and a 1-side output terminal, said first flip-flop receiving said output signals from said digital multiplexer over its data input terminal, said first flip-flop receiving said oscillator frequency signal, from said oscillator, over its clock input terminal, said first flip-flop receiving and inverting an anti-clocking signal over its clear input terminal where said anti-clocking signal is an inverse signal with respect to said clocking signal, said first flip-flop producing an output signal therefrom over its 1-side output terminal; and a second flip-flop which has a data input terminal over which it receives the output of said first flip-flop, said second flip-flop having a clock input terminal over which it receives said oscillator frequency signal from said oscillator, said second flip-flop having a 1- side output terminal over which it outputs said clocking signal, and an O-side output terminal over which it outputs said anti-clocking terminal.

3. A timing circuit, as defined in claim 1, wherein said dividing means includes a divide-by-four timing circuit which comprises:

a first flip-flop which has a data input terminal over which it receives said output signals from said digital multiplexer, said first flip-flop having a clock input terminal over which it receives said oscillator frequency signal from said oscillator, said first flip-flop having a clear terminal over which it receives a NAND output signal, said first flip-flop having a 1- side output over which it produces an output signal;

a second flip-flop having a data input terminal over which it receives the output signal of the first flip-flop, said second flip-flop having a clock input terminal over which it receives said oscillator frequency signal from said oscillator, said second flip-flop having a 1-side output terminal over which it produces an output signal;

a third flip-flop which has a data input terminal over which it receives the output signal of said second flip-flop, said third flip-flop having a clock input terminal over which it receives the clocking frequency signal from said oscillator, said third flip-flop having a 1-side output terminal over which it outputs said clocking signal; and a NAND gate which produces said NAND output signal from the output signal of said second flip-flop, and from the clocking signal it receives from said third flip-flop.

4. A timing circuit, as defined in claim 3, including a single step test circuit which inputs a controllable wait into the digital multiplexer to stop the clock signal, said single step test circuit capable of inputting a signal into the digital multiplexer to restart the clock signal.

5. A timing circuit, as defined in claim 3, including a halt test circuit which inputs the clock signal.

6. A process of producing a clocking signal which has a value to synchronize a microprocessor with digital data input signals, said process comprising the steps of:

generating an oscillator frequency signal which has a value;

performing a divide-by-four on said oscillator frequency signal to produce said clocking signal composed of four cycles of said oscillator frequency signal;

using two of said four cycles of said oscillator frequency signal to synchronize said digital data input signals with said clocking signal; and outputting said clocking signal as soon as said digital data input signals are synchronized with said clocking signal.

* * * * *